(12) United States Patent
Mueller

(10) Patent No.: US 12,125,112 B2
(45) Date of Patent: Oct. 22, 2024

(54) ALLOCATION OF LANDED COSTS

(71) Applicant: SAP SE, Walldorf (DE)

(72) Inventor: Stefan Mueller, Sinsheim (DE)

(73) Assignee: SAP SE, Walldorf (DE)

( * ) Notice: Subject to any disclaimer, the term of this patent is extended or adjusted under 35 U.S.C. 154(b) by 111 days.

(21) Appl. No.: 17/512,003

(22) Filed: Oct. 27, 2021

(65) Prior Publication Data

US 2023/0127937 A1 Apr. 27, 2023

(51) Int. Cl.
*G06Q 40/12* (2023.01)
*G06Q 10/083* (2024.01)
*G06Q 30/0283* (2023.01)

(52) U.S. Cl.
CPC .......... *G06Q 40/12* (2013.12); *G06Q 10/083* (2013.01); *G06Q 30/0283* (2013.01)

(58) Field of Classification Search
CPC .. G06Q 10/083; G06Q 30/0283; G06Q 40/12; G06Q 10/087; G06Q 10/08; G06Q 10/10; G06Q 10/06; G06Q 10/063; G06Q 10/0631; G06Q 10/06311; G06Q 10/06315; G06Q 10/06316; G06Q 30/04; G06Q 30/08; G06Q 40/00; B01D 2239/0241; B01D 2239/025; B01D 2239/0631; B01D 2239/10; B01D 39/1623; B08B 3/00; B08B 3/02; G06K 7/10297; G06K 7/10366; G06K 7/1413; G06K 7/1417; H04L 67/02; H04L 67/04; H04L 67/104; H04L 67/12; H04L 67/535; H04L 9/3236; H04L 9/3239; H04L 9/3247; H04L 9/50
See application file for complete search history.

(56) References Cited

U.S. PATENT DOCUMENTS

| 9,704,161 | B1* | 7/2017 | Oates | G06Q 20/00 |
| 2002/0178117 | A1* | 11/2002 | Maguire | G06Q 20/102 |
| | | | | 705/40 |
| 2005/0160121 | A1* | 7/2005 | Kawabata | G06Q 10/08 |
| | | | | 708/160 |
| 2010/0257008 | A1* | 10/2010 | Rider | G06Q 10/067 |
| | | | | 705/341 |

OTHER PUBLICATIONS

Sap-Img. (Jan. 18, 2018). Unplanned and Plan Delivery Costs In Stock and G/L Account. Unplanned and plan delivery costs in stock and G/L Account. https://www.erpgreat.com/financial/unplanned-and-plan-delivery-costs-in-stock-and-gl-account.htm (Year: 2018).*
Unal, M. O. (Jan. 15, 2021). Planned Unplanned Delivery Costs. SAP Blogs. https://blogs.sap.com/2013/10/12/planned-unplanned-delivery-costs-in-mm/ (Year: 2013).*

* cited by examiner

*Primary Examiner* — Fahd A Obeid
*Assistant Examiner* — Avia Salman
(74) *Attorney, Agent, or Firm* — SCHWEGMAN LUNDBERG & WOESSNER, P.A.

(57) ABSTRACT

Computer-based methods and systems are provided for allocating landed costs. A planned landed cost of materials is calculated based on various planned landed costs. Landed costs are separated into an allocation document to generate a permanent record for cost allocation. When actual landed costs are received the allocation is applied based on different sets of accounting rules and one or more journal entries are generated and persisted based on application of the allocation document and the applied different sets of accounting rules.

20 Claims, 5 Drawing Sheets

ALLOCATE LANDED COSTS

SIV ID 111-1
SERVICE PROVIDER: ABC CARGO
COST COMPONENT: FREIGHT
INVOICED AMOUNT IN DOCUMENT CURRENCY 5500 EUR   IN COMPANY CURRENCY 6875 USD
ALLOCATE BY: GROSS WEIGHT

| EXCLUDE FROM ALLOCATION | INB DEL ITEM ID | MATERIAL ID | QTY (IN PO UOM) | ITEM NET VALUE | GROSS WEIGHT | GROSS VOLUME | PERCENT | AMOUNT TO ALLOCATE | CURRENCY | AMOUNT TO ALLOC | PLANNED COSTS (CC) | ALREADY ALLOCATED (CC) |
|---|---|---|---|---|---|---|---|---|---|---|---|---|
| | 4711-1 | MATERIAL 1 | 1000 EA | 20,000 USD | 2000 KG | 40 QM | 60% | 2200 EUR | | 2750 | 2500 USD | 0 USD |
| | 4712-1 | MATERIAL 2 | 2000 EA | 30,000 USD | 3000 KG | 20 QM | 40% | 3300 EUR | | 4125 | 3750 USD | 0 USD |

PLANNED LANDED COSTS DETA INB_DEL_ID 4711-1

| COST COMPONENT | CALCULATION METHOD | ORIGIN | PLANNED COSTS CURRENCY | PLANNED COSTS (CC) | SERVICE PROVIDER |
|---|---|---|---|---|---|
| FREIGHT | PERCENTAGE | HEADER | 1200 EUR | 1500 | |
| FREIGHT | RATE PER VOLUME | ITEM | 800 EUR | 1000 | ABC CARGO |

SAVE   CLOSE

FIG. 3

ALLOCATION OF LANDED COSTS

BACKGROUND

A variety of landed cost allocation systems exist in which purchasers allocate, in different ways, landed costs associated with acquisition of materials. Existing landed cost allocation systems are typically unable to accurately allocate actual landed costs based on various different accounting standards. A problem exists when allocating the landed cost of a particular material in real-time based on services provided by multiple service providers and associated services. Manual techniques have been used to allocate landed costs, but such techniques are prone to error, are time consuming, require high manual effort, and may vary based on particular accounting system requirements. Additionally, problems arise when maintaining the value of inventory items upon receipt of a material having landed costs that deviate from initial planned landed costs. This is especially true when dealing with calculating inventory value based on different sets of accounting rules.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of various embodiments and the accompanying drawing figures.

In some aspects, the techniques described herein relate to a landed cost allocation system including: a processor; and a non-transitory computer readable storage medium having a computer program stored thereon for allocating a landed cost, wherein the computer program instructs the processor to perform actions including: receiving a purchase price for one or more materials from one or more suppliers; receiving acquisition cost information including information related to a cost of obtaining the one or more materials associated with transporting the one or more materials from a supplier source to a purchaser storage destination; automatically calculating an additional landed cost associated with the one or more materials based on the acquisition cost information and the purchase price; automatically calculating an inventory value of the one or more materials based on the purchase price, the additional landed cost, and a prior inventory valuation associated with currently present inventory of the one or more materials; automatically generating one or more journal entries including the inventory value; and persisting the one or more journal entries to digital storage.

BRIEF DESCRIPTION OF THE DRAWING FIGURES

Embodiments are described in detail below with reference to the attached drawing figures, wherein:

FIG. 3 is an example of a landed costs allocation user interface for use in connection with systems consistent with the principles illustrated in FIG. 1;

Figure 1:
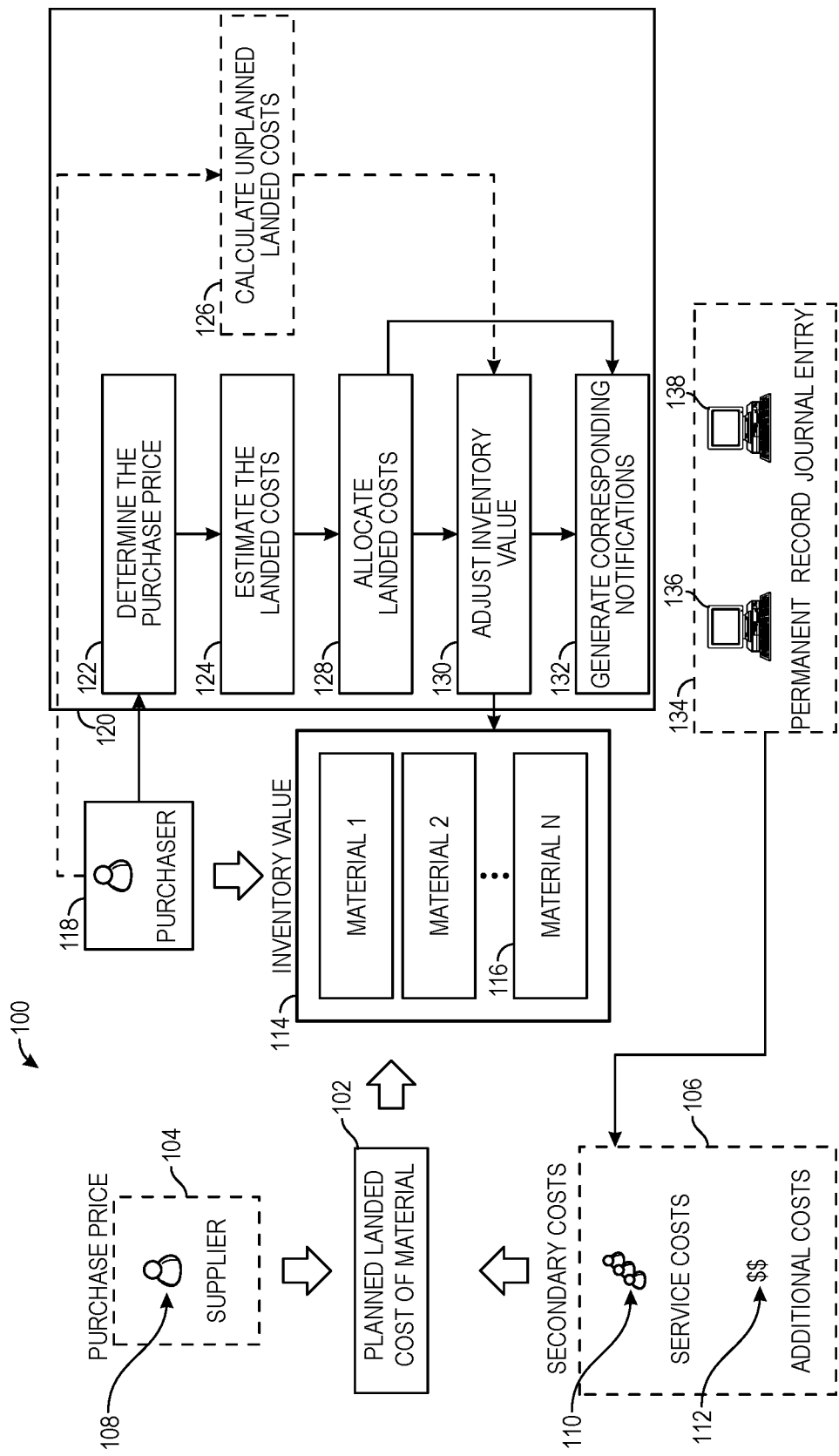
FIG. 1 is a flow diagram illustrating a landed cost allocation system.

The drawing figures do not limit the claimed scope to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the disclosed embodiments. Other embodiments can be utilized, and changes can be made without departing from the scope of the claims. The following detailed description is, therefore, not to be taken in a limiting sense. The scope of patent protection is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

As used herein "landed cost" refers to a cost of an item including an item's purchase price plus all costs related to a purchaser acquiring the item. For example, a portion of the landed costs may come from governments, such as customs and taxes. Landed costs may include costs originating from service providers, such as insurance costs, crating costs, and transportation costs. There may also be additional costs included in the landed costs, such as currency conversion costs.

As used herein, "planned landed cost or estimated landed cost" refers to a landed cost that is contemplated or planned-on before actual costs are realized, i.e., before actual landed cost invoices are processed. Processing landed cost invoices may at various points in the process of calculating actual landed costs, e.g., during material purchasing (purchase order processing), material cost estimate calculation, or in inventory valuation during goods receipt processing. As used herein, "additional landed cost" refers to the landed cost of an item excluding material purchase price for an item.

Allocation is the process of matching invoiced landed costs with inbound delivery documents for inventory-managed material with the purpose of updating the inventory value. Allocation may involve at least two variants: "planned" and "unplanned" allocation. During planned allocation, invoiced landed costs are used in place of the planned landed cost, whereas for unplanned allocation, the invoiced landed costs are added to the purchase price.

Embodiments are contemplated in which a landed cost allocation system is used to allocate a landed costs associated with one or more materials. These calculations may include a moving average inventory value of the one or more materials. In some embodiments, the moving average may include costs accrued due to shipping of the one or more materials, for example, customs cost, tax cost, insurance cost, shipping cost, etc. The system may generate one or more allocation records, which may be treated as an accounting prima nota, associated with a particular cost allocation. In some such embodiments, a new inventory value may be calculated based on various sets of accounting rules, including the calculated moving average of inventor value based on actual landed costs and associated purchase prices of the one or more materials. In some embodiments, the system may calculate an inventory value of the one or more materials based on calculations of a standard inventory value based on actual allocated landed costs as well as an actual purchase price. The system may further provide the landed cost and/or inventory value to an accounting system that applies various sets of accounting rules to generate one or more journal entries.

Turning first to FIG. 1, an exemplary flow diagram relating to some embodiments is depicted and is referred to generally by reference numeral 100. In such embodiments, flow diagram 100 includes planned landed cost 102 of material 116, which may include purchase price 104 and secondary costs 106. Purchase price 104 corresponds to a current price of the material provided by supplier 108. For example, supplier 108, may charge a specified price (e.g., $100) for a specified unit (e.g., 1 lb.) of a material. The cost of the material may further include secondary costs 106. Secondary costs 106 are associated with prices of the material associated with transporting the material from one location to another location. In some embodiments, secondary costs 106 may include costs associated with additional costs 112 (e.g., customs cost, taxes, tariffs, duties, etc.), as well as service costs 110 accrued from service providers (e.g., shipping cost, insurance, etc.).

Secondary costs 106 and purchase price 104 of a particular item of material may be used to determine planned landed cost 102, and subsequently influence inventory value 114. Inventory value 114 may include planned landed cost 102 of one or more material 116. In some embodiments, inventory value 114 may be an average of the actual landed cost of obtaining a previously purchased material and the actual landed cost of obtaining a newly purchased material. For example, if certain quantity of material A was previously purchased with an actual landed cost of $10 per item, and then the same quantity of material A is purchased at a later time with an actual landed cost of $20 per item, then the average inventory value 114 of material A is calculated as $15 per item. In some embodiments, (under certain accounting rules) inventory value 114 may be the actual landed cost of the most recently purchased material. For example, if material A was previously purchased with a landed cost of $10 per item, and then more material A is purchased at a later time with a landed cost of $20 per item, then inventory value 114 of material A is calculated as $20 per item.

Under some accounting rules, inventory value 114 may be the landed cost of the lowest priced purchase material. For example, if material A was previously purchases with a landed cost of $10 per item, and then more material A is purchased at a later time with a landed cost of $20 per item, then inventory value 114 of material A is calculated as $10 per item. It is understood that the inventory value 114 is variable and may depend on fluctuations in secondary costs 106 as well as different accounting rules (e.g., accounting rules used in different jurisdictions for different purposes). As such, a particular calculation of inventory value 114 may be determined in real-time by way of automatic calculations once costs are allocated and actual invoices associated with secondary costs 106 are received and input. This process is further described below.

In order to properly calculate various inventory value 114 (under various sets of accounting rules) of the purchaser's material 116, calculations may be performed in real-time by computer system 120. Computer system 120, at step 122, may determine purchase price 104 of material 116. In some embodiments, purchase price 104 is received by computer system 120 at a human machine interface. In some other embodiments, purchase price 104 is established from a physical document such as a purchase order, using optical character recognition. In some further embodiments, an electronic record associated with a purchase document (e.g., an electronic purchase order) provides a value for purchase price 104. In some such embodiments, such a record is an electronic purchase order exchanged between computer systems using an application programming interface. At step 124, computer system 120 estimates planned landed cost 102 of material 116, based on an estimated or actual purchase price and estimated secondary costs. In this case, computer system 120 may receive acquisition cost information from a human machine interface. In some embodiments, the acquisition cost information may include details related to secondary costs 106. These secondary costs may be received in a similar way as purchase price 104 above.

In some such embodiments, acquisition cost information may include one or more of customs cost, tax cost (i.e., duties and tariffs), shipping cost (i.e., freight), and/or insurance. In an example, computer system 120 may receive information that material 116 is being shipped from Germany by Company A and arriving in the United States. In embodiments, computer system 120 may then calculate secondary costs 106 associated with this shipment, such as taxes and customs as well as insurance and shipping costs accrued by Company A, for example. In embodiments, secondary costs 106 may be further categorized by computer system 120 based on the type of secondary cost 106 they are associated with.

At optional step 126, computer system 120 may calculate unplanned landed costs based on actual received invoices for the shipment of material 116. In an example of step 126, shipment of material 116 may include unanticipated costs (e.g., redirection of cargo shipment based on weather). As such, computer system 120 must include these costs to correctly calculate actual landed costs, which costs may be used adjust to inventory value 114 at step 130. At step 126, computer system 120 may automatically calculate the unplanned cost upon notification from a service provider, e.g., when a service provider provides actual invoices electronically. In some embodiments, computer system 120 may receive information regarding the unanticipated costs from a human machine interface. In some other embodiments, computer system 120 may receive information regarding the unanticipated costs from a shipping company or freight forwarder by way of an automated computer data exchange such as a network application programming interface (API) or other exchange of electronic information (EDI) regarding costs associated with acquiring material 116. Computer system 120 may then automatically calculate a breakdown of unplanned landed costs.

At step 128, landed costs are allocated to create a new prima nota defining landed cost allocations. Usually landed costs are invoiced for one or more deliveries of materials. Often, these may be sourced from multiple suppliers. Therefore, an allocation system is required to effectively and efficiently allocate these landed costs. In some embodiments, landed costs are allocated according to quantity of various items. In other embodiments, landed costs are allocated according to size and/or weight. In yet other embodiments, landed costs are allocated according to value of the associated material. For example, if a shipping container contains two different quantities of two different materials, the shipping costs must be allocated to the materials in some way. In some instances, size and/or weight may be used to allocated shipping costs to a material. In this example, heavy and bulky materials may be of a relatively lower value or otherwise less likely to be subject to damage or loss than smaller lighter materials. For this reason, other secondary costs, such as insurance, may be allocated differently. In this example, the bulky heavier materials would receive a higher allocation of shipping costs, whereas the smaller, lighter, and higher-value materials would receive a larger allocation of insurance costs. Computer system 120 may calculate the sum of one or more of purchase price 104 and secondary costs 106 to determine the planned landed cost 102. Computer system 120 may then allocate the landed costs accordingly. For example, computer system 120 may calculate the tax cost for material A arriving in the United States to be $100. Computer system 120 may allocate $100 accordingly. This example is not meant to be limiting, as computer system 120 may calculate any number of service costs 110, additional costs 112, or purchase prices 104 at step 128 to be allocated.

At step 130, computer system 120 calculates an adjusted inventory value 114 based on information from step 128 and optionally from step 126. For example, the additional costs 112 of material 116 may have increased due to taxes and/or duties being based on cost of material 116 when they are received in the United States, for example. To account for this, computer system 120 updates inventory value 114 based on the increased actual landed cost depending on a particular set of accounting rules. In embodiments, updating inventory value 114 includes updating the inventory value of material 116 already in stock. For example, if purchaser 118 has 50 items of Material A in their inventory having an inventory cost of $10 an item, and purchaser 118 receives a shipment of 200 items of Material A having an inventory cost of $12 an item, computer system 120 updates the value of the original 50 items of Material A to match the inventory cost of the shipped items. In some embodiments, multiple journal entries are created based on multiple sets of accounting rules, based on a landed cost allocation prima nota is persisted in connection with computer system 120 as generated in step 128.

At step 130, inventory value 114 may be adjusted according to different sets of accounting rules, for example, to be either expensed or capitalized based on the specific accounting rules. For example, based on a set of accounting principles, if computer system 120 estimates landed costs at step 124 of material 116 to be $100 (e.g., $80 purchase price, $10 freight, and $10 customs), computer system 120 may calculate the entirety of the landed costs (i.e., $100) to be capitalized. In this example, computer system 120 may update inventory value 114 to state that material 116 is worth $100. In another example, computer system 120 may follow a set of accounting rules that causes part of the landed cost to be expensed. In this example, computer system 120 may update inventory value 114 to state that material 116 is worth $80, and that the additional $20 in landed costs is to be expensed elsewhere. These different accounting principles may be used to update one or more journal entries 138 in downstream step 132. As mentioned above, purchaser 118 requires a correct inventory value 114 to, for example, evaluate the price at which to sell material 116. Purchaser 118 may also require a correct inventory value 114 to, for example, report to corresponding tax auditor purposes. Purchaser 118 may also require a correct inventory value 114 to, for example, report to stock exchange authorities for evaluation of purchaser's 118 value.

At step 132, computer system 120 generates corresponding notifications related to information from step 130. In embodiments, computer system 120 may automatically generate notifications 134. Notifications 134 may include permanent record 136 and journal entry 138. As mentioned above, permanent record 136 (i.e., allocation record) and journal entry 138 may be generated based on different sets of accounting rules. This may allow, for example, two separate journal entries to be generated based on the different sets of accounting rules used. Notifications 134 may be generated in a parallel set of books, such that the same actual landed cost may be used differently to report inventory value 114 based on the accounting rules applied. For example, if purchaser 118 needs to report inventory value 114 in both the United States and Germany, two separate journal entries 138 may be generated based on the set of accounting rules used in the United States (e.g., US GAAP) and the accounting principles used in Germany (e.g., HGB). These separate journal entries 138, may, however, have been generated based on the same information regarding the actual landed cost of material 116 as well as the landed cost allocation prima nota generated in step 128. As such, notifications 134 may follow a set of tax regulations for downstream purposes.

Figure 2:
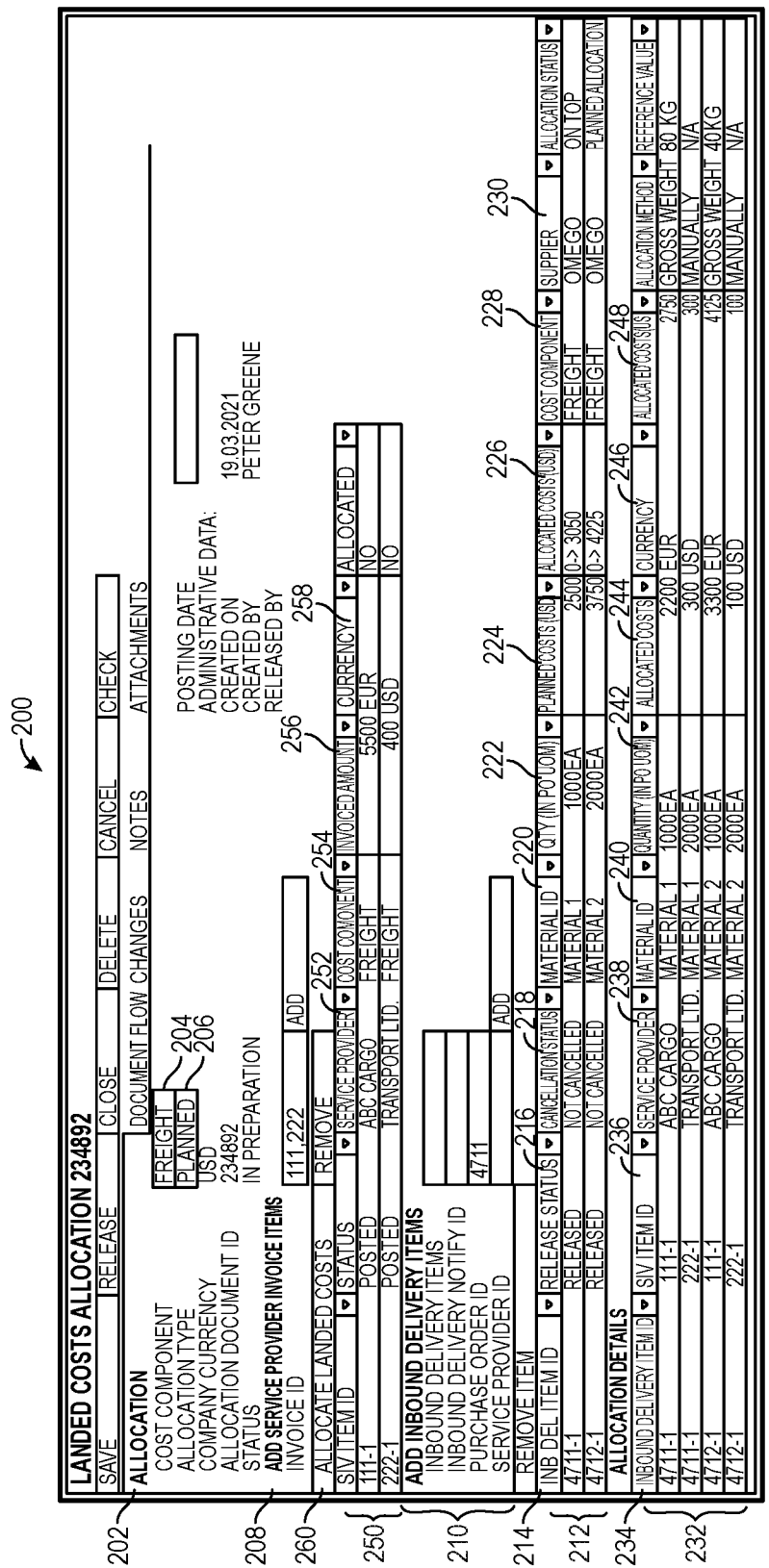
FIG. 2 depicts an example of a landed costs allocation user interface for systems consistent with the principles illustrated in FIG. 1.

Turning now to FIG. 2, an exemplary landed costs allocation user interface 200 for use in connection with the system of FIG. 1 is depicted. In some embodiments, landed costs allocation user interface 200 includes allocation tab 202 which includes data input and output associated with landed costs of materials. Allocation tab 202, in embodiments, includes cost component 204 and allocation type 206. Cost component 204 may generate automatically based on an inputted work list. Allocation type 206 may be either planned or unplanned, based on embodiments described in FIG. 1. In some embodiments, if unplanned landed costs are incurred, allocation type 206 may be used to select unplanned. This may signal to the computer to calculate unplanned landed costs based on information inputted to landed costs allocation user interface 200. In these embodiments, calculations of unplanned landed costs may be used for downstream purposes to automatically calculate an updated landed cost, automatically calculate an updated moving average, automatically calculate an updated inventory value, automatically update a journal entry to include the unplanned landed costs, and/or automatically generate a second allocation record.

In some embodiments, landed costs allocation user interface 200 includes add service provider invoice items tab 208. A user, in embodiments, may populate the items listed hereinafter by selecting a provider invoice item to populate. These can include one or more of the following: items which match the cost component, items which are not assigned to any other allocation document, items which belong to the same company, or items which have the status posted.

In embodiments, landed costs allocation user interface 200 includes add inbound delivery items input 210. In some embodiments, inbound delivery items input 210, may be populated by a user with inbound materials for which invoiced landed costs may be allocated. Inbound delivery items input 210 may include an add action, which when selected by the user, will automatically populate inbound delivery items list 212. Inbound delivery items list 212 may include information regarding the shipment of one or more materials. In some embodiments, this may include one or more of inbound delivery item ID 214, release status 216, cancellation status 218, material ID 220, and quantity of the material 222. Inbound delivery item ID 214 is an identifier used by the computer to track each material. Release status 216 may have information regarding whether the material has been released by supplier 230 or not. Cancellation status 218 may have information regarding whether the shipment of the material has been cancelled. Material ID 220 may include labeling of the material for purposes of accounting for the cost of each material individually. In embodiments, the quantity of material 222, if applicable, may contain information on the amount of material being shipped. Quantity of material 222 may be stated in weight, volume, raw number, or size.

In some embodiments, inbound delivery items list 212 may include information on the costs of the shipment. In these embodiments, this may include planned costs 224, allocated costs 226, cost component 228, and supplier 230. Planned costs 224 may include information on the service costs and additional costs associated with shipment of the material. In some embodiments, allocated costs 226 may include the planned cost in addition to the purchase price of the material. In the example depicted in FIG. 2, planned cost 224 for "Material 1" (i.e., material ID 220) is $2500 USD. However, landed costs added an additional $550 USD (see below). In some embodiments, cost component 228 may include a category by which to label the landed cost. For example, cost component 228 may be one of freight, insurance, tax, customs, etc. In embodiments, supplier 230 includes information on the entity from which the material is purchased. Exemplary inbound delivery items list 212 is shown with two inbound delivery items; however, inbound delivery items list 212 may include any number of inbound delivery items needed to properly allocate landed costs.

In some embodiments, landed costs allocation user interface 200 includes allocation details list 232. Allocation details list 232 may be automatically populated when a user selects allocate landed costs action 260, which is further discussed below. In these embodiments, allocation details list 232 may include inbound delivery item ID 234, which is the same as ID 214 and follows the material, such that costs may be categorized by material. In some embodiments, allocation details list 232 includes supplier invoice (SIV) item ID 236. SIV item ID 236 includes a reference number corresponding to each service provider 238, such that costs may be categorized by service provider 238.

In some embodiments, allocation details list 232 may include material ID 240 and quantity 242. In these embodiments, material ID 240 and quantity 242 are the same as provided in inbound delivery items list 212. In some embodiments, allocation details list 232 includes allocated costs 244. Allocated costs 244 may include the costs accrued per service provider 238 for a material. In an example, planned cost 224 of "Material 1" is $2500 USD. In allocation details list 232, this is broken down into allocated costs 244 of $2200 EUR to service provider 238 "ABC Cargo" and $300 USD to service provider 238 "Transport LTD."

In some embodiments, allocation details list 232 includes currency 246. Listing currency 246 allows for calculations of exchange rates between one currency and another. In some such embodiments, these calculations populate allocated costs in company currency 248. In an example, the $2200 EUR listed as allocated costs 244 for "Material 1" may become $2750 USD listed in allocated costs in company currency 248. It is understood that allocated costs in company currency 248 may be populated by any currency. Calculations of allocated costs in the company currency 248 are used downstream as discussed below in connection with FIG. 3.

Information from allocation details list 232 is combined to form secondary costs list 250. Secondary costs list 250 combines the secondary costs of one or more materials and categorizes them by service provider 238 using SIV item ID 236. In embodiments, secondary costs list 250 includes service provider 252 category, which is the same service provider 238 listed in allocation details list 232. In embodiments, secondary costs list 250 includes cost component 254. Cost component 254 allows for categorization of the service cost based on type (e.g., shipping cost, insurance, tax, customs, etc.).

In some embodiments, secondary costs list 250 includes invoiced amount 256. Invoiced amount 256 may include the combination of allocated costs 244 from allocation details list 232. In an example, allocated cost 244 of "Material 1" is $300 USD and "Material 2" is $100 USD for service provider 238 "Transport LTD." Combined, the total invoiced amount 256 for "Transport LTD." is $400 USD. In some embodiments, secondary costs list 250 may include currency 258, which is associated with invoiced amount 256. In an example, invoiced amount 256 for "ABC Cargo" is in EUR while invoiced amount 256 for "Transport LTD." is in USD. In some embodiments, landed costs allocation user interface 200 has allocate landed costs action 260. In these embodiments, allocate landed costs action 260 generates allocate landed costs user interface 300, shown in FIG. 3 and discussed below.

Turning now to FIG. 3, an exemplary allocate landed costs user interface is depicted, and referred to generally by the numeral 300. As mentioned above, allocate landed costs user interface 300 is generated by allocate landed costs action 260 on landed costs allocation user interface 200. Allocate landed costs user interface 300 includes information regarding an amount allocated per service provider 302. In an example, allocate landed costs user interface 300 is populated by information regarding the amount to be allocated to service provider 302 "ABC Cargo." In some embodiments, information from allocate landed costs user interface 300 may be used in downstream applications to generate, for example, one or more journal entries.

In some embodiments, allocate landed costs user interface 300 may include service provider 302 and cost component 304. Service provider 302 and cost component 304 are automatically pulled from landed costs allocation user interface 200. Allocate landed costs user interface 300, in embodiments, includes allocate by selection 306. In some embodiments, allocate by selection 306 allows for the allocations to be categorized by one or more of the material net value, the material weight, the material volume, the material quantity, or a manual entry. In an example, the landed costs are allocated by gross weight. In embodiments, once a category is selected by a user, allocate landed costs user interface 300 will populate landed cost per item 310 and detailed landed cost list 332.

In some embodiments, landed cost per item 310 includes material quantity 312, material value 314, gross weight 316, gross volume 318, and percent 320. One or more of the amounts in material quantity 312, material value 314, gross weight 316, gross volume 318, and percent 320 may be used to calculate planned costs 328, which is further described below. In some embodiments, computer system 120 may automatically populate amount to allocate 322 from the allocated costs 244 of landed costs allocation user interface 200. In some embodiments, allocate landed costs user interface 300 may label currency 324 of amount to allocate 322. In these embodiments, allocate landed costs user interface 300 may calculate amount to allocate in company currency 322. Company currency 322 may be the preferred currency used by the company generating the journal entry.

In some embodiments, landed cost per item 310 may include planned costs 328. Planned costs 328 may have been previously calculated, and details of these calculations may populate detailed landed cost list 332. Detailed landed cost list 332 may specify how planned costs 328 of a material was calculated. In an example, planned costs 328 of "Material 1" is depicted in FIG. 3. In this example, to calculate planned costs 328, two separate calculations were performed. In the first calculation, percent 320 was used to calculate planned costs 336. In this example, material quantity 312 (e.g., 1000EA) is multiplied by material value 314 (e.g., $20 USD). The total of which (e.g., 2000), is then multiplied by percent 320 (e.g., 60%) to calculate planned cost 336 of $1200 EUR. In another example, the rate per volume is used to calculate planned cost 336. In this example, material value 314 (e.g., $20 USD) is multiplied by gross volume 318 (e.g., 40 QM) to calculate planned cost 336 of $800 EUR. It is contemplated that any combination of calculations from one or more of material quantity 312, material value 314, gross weight 316, gross volume 318, or percent 320 may be used to calculate planned costs 336. Similar to methods described above, detailed landed cost list 332 may display planned cost in company currency 338. In embodiments, the sum of planned cost in company currency 338 is displayed in planned costs 328 for each material/item.

In some embodiments, landed cost per item 310 may include already allocated column 330, which may be listed in the company currency. In the case that a company has already allocated funds for a specific material purchased, this amount may be deducted from amount to allocate in company currency 326. In some embodiments, the sum of amount to allocate in company currency 326 may be used to calculate invoiced amount in company currency 340. In these embodiments, invoiced amount in company currency 340 may be the total landed cost for service provider 302.

In embodiments, the difference between invoiced amount in company currency 340 and planned costs 328 may be used to automatically calculate inventory value (e.g., inventory value 114). For example, a purchaser may have calculated an inventory value based on total planned costs 328 of "Material 1" and "Material 2". However, total planned costs 328 may be less than invoiced amount in company currency 340. In such a scenario, the inventory value may be increased accordingly such that the updated inventory value matches invoiced amount in company currency 340 for "Material 1" and "Material 2". This automatic updating of the inventory value provides real-time feedback on the value of individual materials owned by a company as well as the overall value of the assets owned by the company.

In some embodiments, allocate landed costs user interface 300 may be used to automatically generate corresponding notifications. In embodiments, information from allocate landed costs user interface 300 may be used to generate an allocation record prima nota (e.g., permanent record 136). The allocation record may include specific details about the movement of money from a purchaser (e.g., purchaser 118) to service provider 302, or vice versa. In embodiments, the allocation record (i.e., prima nota) may follow a specific set of tax regulations for downstream purposes. In embodiments, the allocation record may be made readily available to one or more auditors via the system described in FIG. 5.

In some embodiments, allocate landed costs user interface 300 may be used to automatically generate a journal entry (e.g., journal entry 138). The journal entry may be readily available to service provider 302 using systems described in FIG. 5. For example, the computer (e.g., computer system 120) may automatically produce a journal entry comprising some or all of the information on allocate landed costs user interface 300, in which both the purchaser (e.g., purchaser 118) and service provider 302 can access the journal entry in real-time. In some embodiments, the journal entry may follow a specific set of tax regulations for downstream purposes. Generation of the journal entry may follow a specific set of accounting principles for downstream purposes. For example, the journal entry may follow accounting principles such that reporting of the inventory value is correctly calculated based on the required set of accounting principles. For example, some countries may require inventory value to be calculated by the moving average of the materials. In another example, some countries may require inventory value to be calculated based on a standard valuation. In some cases, the journal entry may be generated following a set of accounting principles based solely on a method of accounting to provide business visibility for managers of the company. For example, a company may want to determine whether they are losing money by selling a specific item. In this example, the company may benefit from calculating the inventory value and generating the journal entry based on a specific set of accounting rules that may differ from those specified by particular legal jurisdictions.

Figure 4:
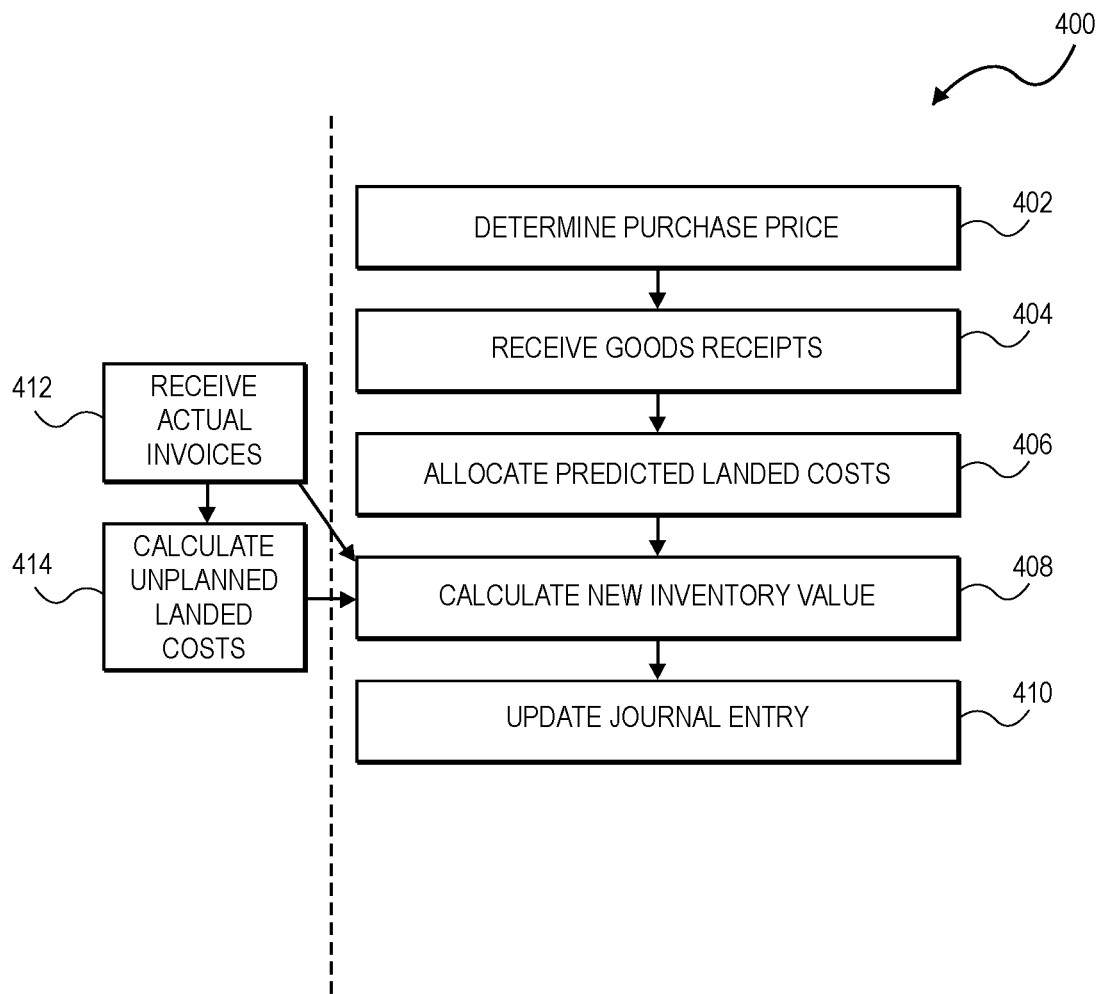
FIG. 4 is a flow diagram illustrating a landed cost allocation system.
Figure 5:
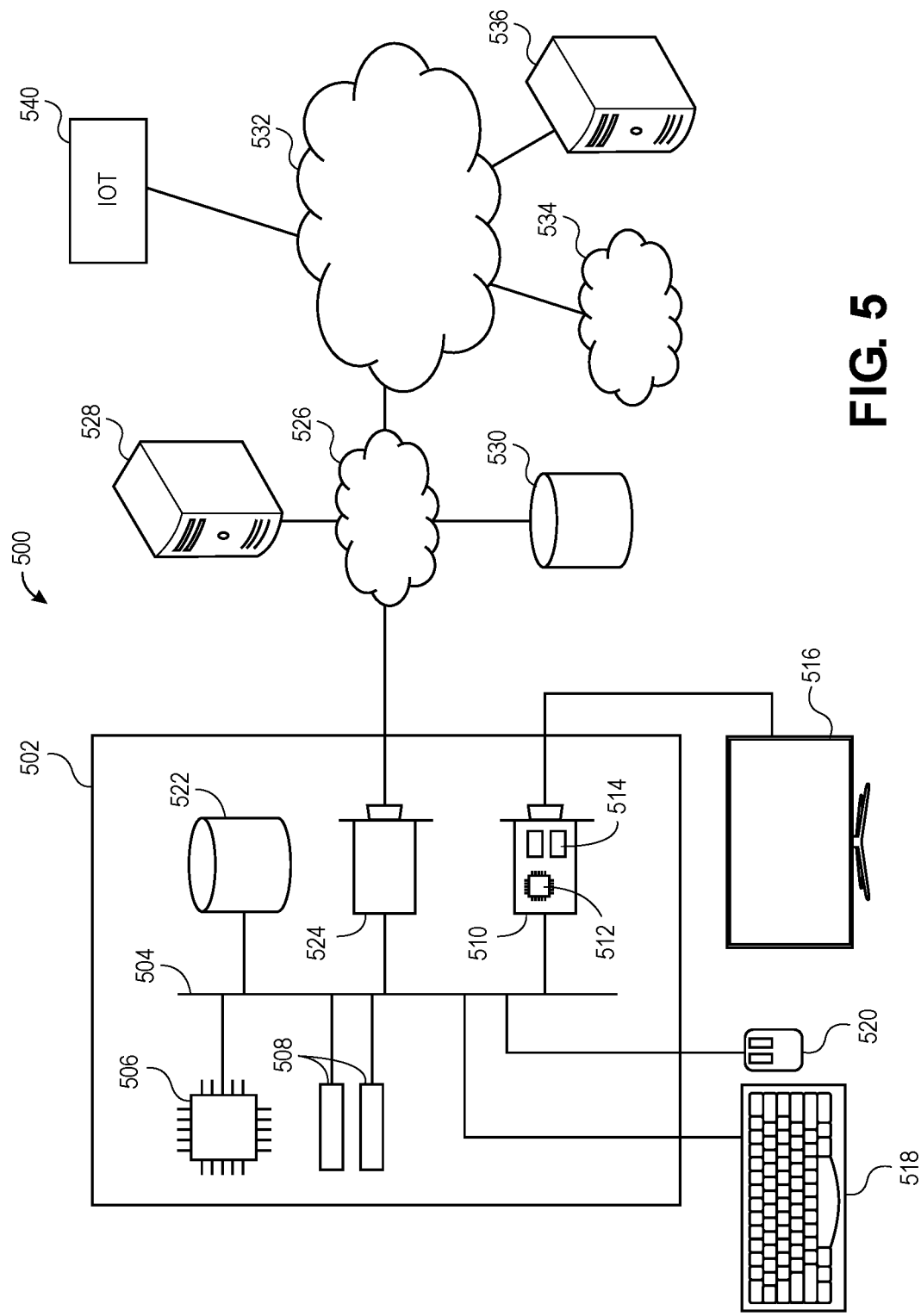
FIG. 5 is a system hardware diagram illustrating the various hardware components for use in connection with systems consistent with the present teachings.

Referring now to FIG. 4, an exemplary flow-chart diagram, referred to generally as numeral 400, is depicted relating to some embodiments. At step 402, a purchase price of a material is determined. In embodiments, computer (e.g., computer system 120) acquires the purchase price of the material through landed costs allocation user interface 200. In some embodiments, the purchase price may be inputted by a user into landed costs allocation user interface 200. In some embodiments, the computer may receive the purchase price from a supplier electronically. In some embodiments, the computer retrieves the purchase price from an electronic purchase order as received in a memory, as depicted in FIG. 5, and described below.

At step 404, the goods receipts are received. In some embodiments, a computer (e.g., computer system 120) may receive the goods receipts of one or more material ID 220. In some embodiments, the goods receipts include one or more of purchase price, shipping costs (i.e., freight), insurance, taxes, or customs, which are associated with shipping material ID 220. In some embodiments, the goods receipts include an amount owed to one or more service provider 238. In some embodiments, the computer receives acquisition cost information therein allowing the computer to calculate the landed costs. In some embodiments, the computer may retrieve acquisition cost information about the shipment of the material therein allowing the computer to calculate the landed costs. The landed costs may be automatically calculated and populate allocated costs 244 of landed costs allocation user interface 200.

At step 406, the predicted landed costs (i.e., planned landed costs) are allocated. In embodiments, a computer (e.g., computer system 120) may allocate the predicted landed costs based on the goods receipts received at step 404. In some embodiments, a computer may allocate the predicted landed costs based on information inputted by a user. In some embodiments, a predetermined, fixed allocation prima nota for the predicted landed costs based on information retrieved from a memory, as depicted in FIG. 5, and described below.

At step 412, the actual invoices of the landed costs are received. In embodiments, a computer (e.g., computer system 120) may receive the invoices for a material that was purchased. In some embodiments, the invoices may include costs associated with both the purchase price (e.g., purchase price 104) and secondary costs (e.g., secondary costs 106). The sum of these invoices may be the actual landed cost of a material. In some embodiments, the computer may receive the actual invoices via information inputted by a user. In some embodiments, the computer may receive the actual invoices via a supplier or a service provider. In some embodiments, method 400 may proceed to step 408, such as, for example, if the sum of the actual invoices matches the predicted landed costs. In some embodiments, method 400 may proceed to step 414, such as, for example, if the sum of the actual invoices differs from the predicted landed costs.

At step 414, the unplanned landed costs are calculated. In embodiments, a computer (e.g., computer system 120) may calculate the unplanned landed costs based on information from the actual invoices as well as the predicted landed costs. In embodiments, the unplanned landed costs are equal to the difference between the planned landed costs and the actual invoices. Unplanned landed costs may be used downstream to determine updated inventory valuations for various inventory items depending on various sets of accounting rules.

At step 408, the new inventory value is calculated. Once step 406, and optionally 414, are performed for one or more materials, the computer (e.g., computer system 120) may automatically calculate an updated inventory value (e.g., inventory value 114). In some embodiments, the inventory value may be calculated any time a new material is purchased. In some embodiments, the inventory value may be calculated on a predetermined schedule (i.e., once an hour, once a day, once a week, etc.).

At step 410, a journal entry is updated. In embodiments, the computer (e.g., computer system 120) may generate one or more journal entries (e.g., journal entry 138) based on the calculations performed in previous steps. In embodiments, the journal entry may include one or more data sets from allocate landed costs user interface 300. In some embodiments, the computer will automatically provide the journal entry to one or more service providers using the system described in FIG. 5. In some embodiments, the journal entry may be a financial ledger wherein the financial ledger allows the purchaser and auditors, etc. to keep track, real-time, of costs that are expensed or capitalized, depending on various sets of accounting rules. In some embodiments, the journal entries may be persisted in the form of a parallel set of books, such that the parallel books may be reported on in real-time. In some embodiments, the parallel books may be generated/updated based on different sets of accounting rules. For example, one set of books may calculate the inventory value based on standard valuation of materials in inventory. Alternatively, another set of books may calculate the inventory value based on a moving average of materials in the inventory, based on actual landed costs. In some embodiments, the journal entries are automatically updated when, at step 414, unplanned landed costs are calculated and added to the overall cost of a material.

Turning to FIG. 5, the physical hardware that makes up the system will now be discussed. System 500 is depicted as comprising an exemplary hardware platform that can form one element of certain embodiments. Computer 502 can be a desktop computer, a laptop computer, a server computer, a mobile device such as a smartphone or tablet, or any other form factor of general- or special-purpose computing device. Depicted with computer 502 are several components, for illustrative purposes. In some embodiments, certain components may be arranged differently or absent. Additional components may also be present. Included in computer 502 is system bus 504, whereby other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508.

Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media and may be internally installed in computer 502 or externally and removably attached.

Finally, network interface card (NIC) 524 is also attached to system bus 504 and allows computer 502 to communicate over a network such as local network 526. NIC 524 can be any form of network interface known in the art, such as Ethernet, ATM, fiber, Bluetooth, or Wi-Fi (i.e., the IEEE 802.11 family of standards). NIC 524 connects computer 502 to local network 526, which may also include one or more other computers, such as computer 528, and network storage, such as data store 530. Local network 526 is in turn connected to Internet 532, which connects many networks such as local network 526, remote network 534 or directly attached computers such as computer 536. In some embodiments, computer 502 can itself be directly connected to Internet 532.

The computer program of embodiments includes a plurality of code segments executable by a computing device for performing the steps of various methods consistent with the present teachings. The steps of the method may be performed in the order described, or they may be performed in a different order, unless otherwise expressly stated. Furthermore, some steps may be performed concurrently as opposed to sequentially. Also, some steps may be optional. The computer program may also execute additional steps not described herein. Computer programs, systems, and methods consistent with embodiments of the present disclosure may be implemented in hardware, software, firmware, or combinations thereof using a user inquiry system, which broadly includes server devices, computing devices, and a communications network.

The computer program of embodiments of the present teachings may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), workstations, desktop computers, laptop computers, palmtop computers, tablet computers, portable digital assistants (PDA), smart phones, smart watches, other smart wearables, and the like, or combinations thereof. Various embodiments of the computing device may also include voice communication devices, such as cell phones and/or smart phones. In some embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

The computer program may run on computing devices or, alternatively, may run on one or more server devices. In certain embodiments, the computer program may be embodied in a stand-alone computer program (i.e., an "app") downloaded on a user's computing device or in a web-accessible program that is accessible by the user's computing device via the communications network. As used herein, the stand-along computer program or web-accessible program provides users with access to an electronic resource from which the users can interact with various embodiments.

In some embodiments, users may be provided with different types of accounts. Each type of account may provide their respective user with unique roles, capabilities, and permissions with respect to implementing certain embodiments. For instance, a purchaser may be provided with a landed costs allocation account that permits the purchaser to access data records that are applicable to allocating landed costs of materials. Additionally, a service provider may be provided with a service provider account the permits the service provider to access data records that are applicable to receiving one or more of a journal entry and a permanent record. Additionally, a tax auditor may be provided with a tax auditor account that permits the tax auditor to access data records that are applicable to receiving one or more of a journal entry and a permanent record. In addition, any number and/or any specific types of accounts is provided as may be necessary to carry out the functions, features, and/or implementations of the present teachings. Upon a purchaser, service provider, or tax auditor logging in to the electronic resource for a first time, the purchaser, service provider, or tax auditor may be required to provide various items of identification information to create their respective accounts. Such identification information may include, for instance, personal name, business name, email address, phone number, or the like. Upon providing the identification information, the user may be required to enter (or may be given) a username and password, which may be required to access the electronic resource.

Execution of the computer programs consistent with the present teachings performs steps of the method of certain embodiments. Because many materials may be purchased at one time, therein requiring updating of the information stored, displayed, and acted upon by the computer program, information displayed by the computer program is displayed in real-time. "Real-time" as defined herein is when the CPU 506 of the system 500 performs the steps less than every 1 second, every 500 milliseconds, every 100 milliseconds, or every 16 milliseconds.

Methods for generating the journal entry broadly include the following actions: receiving goods receipts, allocating the landed costs, receiving actual invoices, calculating the unplanned landed costs, and generating a journal entry. The journal entry may be kept for internal purposes or shared with others, such as a service provider. For example, computer 502 may receive the goods receipts, allocate the landed costs, receive the actual invoices, calculate the unplanned landed costs, generate a journal entry, and send the journal entry to a service provider computer (e.g., computer 536) through internet 532. Additional steps may also occur when a computer (e.g., computer 502) calculates the inventory value. In this step, computer 502 may calculate the inventory value, update the inventory value, and notify other computers (e.g., computer 528) on a local network (e.g., local network 526), for example, if computer 502 and computer 528 are associated with the same purchaser. Further steps may also occur when a computer (e.g., computer 502) generates a permanent record. In this step, computer 502 may generate a permanent record based on one or more of the purchase price and the allocated landed costs. Computer 502 may make the permanent record readily available to other computers (e.g., computer 528 and computer 536) via networks (e.g., local network 526 and internet 532). In this way, others (e.g., tax auditors) may view the permanent record.

Although this disclosure has been described with reference to the embodiments illustrated in the attached drawing figures, it is noted that equivalents may be employed and substitutions made herein without departing from the scope of the claims.

Having thus described various embodiments, what is claimed as new and desired to be protected by Letters Patent includes the following:

1. A landed cost allocation system comprising:
a processor; and
a non-transitory computer readable storage medium having a computer program stored thereon for allocating a landed cost, wherein the computer program instructs the processor to perform actions comprising:
rendering a landed costs allocation user interface on a computer display, the landed costs allocation user interface including an allocation details tab having a first selectable user interface element allowing a user to select an allocate landed costs action and a second selectable user interface element allowing a user to change a type of allocation of landed costs;
receiving, via the landed costs allocation user interface, a purchase price for one or more materials from one or more suppliers;
receiving, via the landed costs allocation user interface, acquisition cost information comprising information related to a cost of obtaining the one or more materials associated with transporting the one or more materials from a supplier source to a purchaser storage destination;
receiving one or more acquisition cost allocation breakdowns, via the landed costs allocation user interface, allocating specific acquisition costs associated with each of the one or more materials;
receiving an indication that the user has selected the first selectable user interface element;
in response to the receiving of the first selectable user interface element, automatically populating the allocation details tab with allocation information including the purchase price and acquisition cost;
rendering, in the landed costs allocation user interface, a first inventory value associated with the one or more materials;
receiving, by the processor, an indication that the user has selected the second selectable user interface element to change the type of allocation of the landed costs from planned to unplanned;
in response to the receiving of the indication that the user has selected the second selectable user interface element, automatically calculating, by the processor, an unplanned landed cost associated with the one or more materials based on the acquisition cost information, the purchase price, and the one or more acquisition cost allocation breakdowns and automatically updating the populated allocation details tab of the landed costs allocation user interface based on the unplanned landed cost;
automatically calculating, by the processor, an inventory value of the one or more materials based on the purchase price, the unplanned landed cost, and a prior inventory valuation associated with currently present inventory of the one or more materials;
automatically generating, by the processor, one or more journal entries comprising the inventory value;
persisting the one or more journal entries to digital storage; and
automatically updating, by the processor, the first inventory value displayed in the landed costs allocation user interface so that the user sees an updated value in real-time.

2. The landed cost allocation system of claim 1, the actions further comprising:
calculating the inventory value based on a moving average of the one or more materials.

3. The landed cost allocation system of claim 1, the actions further comprising:
receiving an unanticipated cost of transporting the one or more materials; and
automatically calculating the unplanned landed cost of the one or more materials based on the unanticipated cost.

4. The landed cost allocation system of claim 3, the actions further comprising:
automatically calculating an updated inventory value based on the unplanned landed cost;
automatically calculating an updated landed cost comprising a sum of the landed cost and the unplanned landed cost; and
providing the updated landed cost to the one or more journal entries.

5. The landed cost allocation system of claim 3, the actions further comprising:
generating an allocation record comprising one or more of the purchase price, the landed cost, and the unplanned landed cost.

6. The landed cost allocation system of claim 1, wherein the acquisition cost information comprises one or more of a customs cost, a tax cost, an insurance cost, or a shipping cost.

7. The landed cost allocation system of claim 1, wherein the one or more journal entries follow a set of accounting rules.

8. A method for allocating landed costs, the method comprising:
rendering a landed costs allocation user interface on a computer display, the landed costs allocation user interface including an allocation details tab having a first selectable user interface element allowing a user to select an allocate landed costs action and a second selectable user interface element allowing a user to change a type of allocation of landed costs;
receiving, via the landed costs allocation user interface, a purchase price for one or more materials from one or more suppliers;
receiving, via the landed costs allocation user interface, acquisition cost information comprising information related to a cost of obtaining the one or more materials associated with transporting the one or more materials from a supplier source to a purchaser storage destination;
receiving one or more acquisition cost allocation breakdowns, via the landed costs allocation user interface, allocating specific acquisition costs associated with each of the one or more materials;
receiving an indication that the user has selected the first selectable user interface element;
in response to the receiving of the first selectable user interface element, automatically populating the allocation details tab with allocation information including the purchase price and acquisition cost;

rendering, in the landed costs allocation user interface, a first inventory value associated with the one or more materials;

receiving, by a processor, an indication that the user has selected the second selectable user interface element to change the type of allocation of the landed costs from planned to unplanned;

in response to the receiving of the indication that the user has selected the second selectable user interface element, automatically calculating, by the processor, an unplanned landed cost associated with the one or more materials based on the acquisition cost information, the purchase price, and the one or more acquisition cost allocation breakdowns and automatically updating the populated allocation details tab of the landed costs allocation user interface based on the unplanned landed cost;

automatically calculating, by the processor, an inventory value of the one or more materials based on the purchase price, the unplanned landed cost, and a prior inventory valuation associated with currently present inventory of the one or more materials;

automatically generating, by the processor, one or more journal entries comprising the inventory value;

persisting the one or more journal entries to digital storage; and automatically updating, by the processor, the first inventory value displayed in the landed costs allocation user interface so that the user sees an updated value in real-time.

9. The method of claim 8 further comprising:
automatically calculating the inventory value based on a moving average of the one or more materials.

10. The method of claim 8, wherein the acquisition cost information comprises one or more of a customs cost, a tax cost, an insurance cost, or a shipping cost.

11. The method of claim 8, further comprising: generating an allocation record comprising one or more of the purchase price, the landed costs, and the unplanned landed cost.

12. The method of claim 11 further comprising:
providing the allocation record to one or more auditors via a user interface over a network.

13. The method of claim 11, wherein the allocation record follows a set of accounting rules.

14. A landed cost allocation system, the system comprising:
a processor; and
one or more non-transitory computer readable storage media having a computer program stored thereon for allocating a landed cost, wherein the computer program instructs the processor to perform actions comprising: rendering a landed costs allocation user interface on a computer display, the landed costs allocation user interface including an allocation details tab having a first selectable user interface element allowing a user to select an allocate landed costs action and a second selectable user interface element allowing a user to change a type of allocation of landed costs;

receiving, via the landed costs allocation user interface, a purchase price for one or more materials from one or more suppliers;

receiving, via the landed costs allocation user interface, acquisition cost information comprising information related to a cost of obtaining the one or more materials associated with transporting the one or more materials from a supplier source to a purchaser storage destination;

receiving, by the processor, one or more acquisition cost allocation breakdowns, via the landed costs allocation user interface, allocating specific acquisition costs associated with each of the one or more materials;

receiving an indication that the user has selected the first selectable user interface element;

in response to the receiving of the first selectable user interface element, automatically populating the allocation details tab with allocation information including the purchase price and acquisition cost;

rendering, in the landed costs allocation user interface, a first inventory value associated with the one or more materials;

receiving an indication that the user has selected the second selectable user interface element to change the type of allocation of the landed costs from planned to unplanned;

in response to the receiving of the indication that the user has selected the second selectable user interface element, automatically calculating, by the processor, an unplanned landed cost associated with the one or more materials based on the acquisition cost information, the purchase price, and the one or more acquisition cost allocation breakdowns and automatically updating the populated allocation details tab of the landed costs allocation user interface based on the unplanned landed cost;

automatically calculating, by the processor, an inventory value of the one or more materials based on the purchase price, the unplanned landed cost, and a prior inventory valuation associated with currently present inventory of the one or more materials;

automatically generating, by the processor, one or more journal entries comprising the inventory value;

persisting the one or more journal entries to digital storage; and automatically updating, by the processor, the first inventory value displayed in the landed costs allocation user interface so that the user sees an updated value in real-time.

15. The landed cost allocation system of claim 14, the actions further comprising:
receiving, at a human machine interface, an unanticipated cost of transporting the one or more materials; and
automatically calculating the unplanned landed cost of the one or more materials based on the unanticipated cost.

16. The landed cost allocation system of claim 15, the actions further comprising:
automatically calculating an updated inventory value based on the unplanned landed cost;
automatically calculating an updated landed cost comprising a sum of the landed cost and the unplanned landed cost; and
providing the updated landed cost to the one or more journal entries.

17. The landed cost allocation system of claim 16, the actions further comprising:
generating an allocation record comprising one or more of the purchase price, the landed cost, and the unplanned landed cost.

18. The landed cost allocation system of claim 14, wherein the acquisition cost information comprises one or more of a customs cost, a tax cost, an insurance cost, or a shipping cost.

19. The landed cost allocation system of claim 16, wherein the one or more journal entries follow a set of accounting rules.

20. The landed cost allocation system of claim 17, wherein the allocation record follows a set of tax regulations.

* * * * *